(12) United States Patent
Choi et al.

(10) Patent No.: US 10,054,144 B2
(45) Date of Patent: Aug. 21, 2018

(54) MOUNTING BOLT FOR SUB-FRAME

(71) Applicant: SUNGWOO HITECH CO., LTD., Busan (KR)

(72) Inventors: Dong Won Choi, Busan (KR); Mun Yong Lee, Busan (KR)

(73) Assignee: SUNGWOO HITECH CO., LTD., Busan (KR)

( * ) Notice: Subject to any disclaimer, the term of this patent is extended or adjusted under 35 U.S.C. 154(b) by 28 days.

(21) Appl. No.: 15/185,087

(22) Filed: Jun. 17, 2016

(65) Prior Publication Data

US 2017/0173724 A1  Jun. 22, 2017

(30) Foreign Application Priority Data

Dec. 18, 2015 (KR) .................. 10-2015-0181674

(51) Int. Cl.
*F16B 35/06* (2006.01)
*F16B 19/00* (2006.01)
*B23K 11/00* (2006.01)
*B23K 35/02* (2006.01)
*F16B 19/02* (2006.01)

(52) U.S. Cl.
CPC .......... *F16B 19/00* (2013.01); *B23K 11/0053* (2013.01); *B23K 35/0288* (2013.01); *F16B 35/06* (2013.01); *F16B 19/02* (2013.01)

(58) Field of Classification Search
CPC .... F16B 37/061; F16B 35/06; B23K 35/0288; B23K 11/0053
USPC .......................................... 411/171, 396, 388
See application file for complete search history.

(56) References Cited

U.S. PATENT DOCUMENTS

| | | | |
|---|---|---|---|
| 2,213,630 A * | 9/1940 | Gade ...................... | B21K 1/463 219/93 |
| 3,020,987 A * | 2/1962 | Schaurte ............... | F16B 37/061 219/118 |
| 4,409,460 A * | 10/1983 | Nishii .................... | B23K 11/14 219/93 |
| 4,689,958 A * | 9/1987 | Arino ................... | B60T 13/567 411/171 |

(Continued)

FOREIGN PATENT DOCUMENTS

| CN | 1524164 | 8/2004 |
|---|---|---|
| CN | 202348902 | 7/2012 |

(Continued)

*Primary Examiner* — Flemming Saether
(74) *Attorney, Agent, or Firm* — Lex IP Meister, PLLC (57) ABSTRACT

A mounting bolt for a sub-frame is disclosed. A mounting bolt for a sub-frame that is used to engage a sub-frame to a front side member of a vehicle according to one or a plurality of exemplary embodiments of the present invention may include a bolt body that is inserted into a penetration hole of a mounting bracket fixed on the front side member and is joined to the mounting bracket through a first flange that is formed at an upper end circumference thereof, a support body at which a second flange is formed at a lower end circumference to have a hollow space and is disposed on the bolt body, and a joining plate that is interposed between the first flange and the second flange and is welded with a first join protrusion that is formed on an upper surface of the first flange and a second join protrusion that is formed on a lower surface of the second flange by electrical resistance.

7 Claims, 6 Drawing Sheets

(56) References Cited

U.S. PATENT DOCUMENTS

| | | | | | |
|---|---|---|---|---|---|
| 5,253,966 | A | * | 10/1993 | Clemens | F02M 35/10072 249/165 |
| 5,567,005 | A | * | 10/1996 | Kosuge | B62D 21/02 296/204 |
| 5,782,194 | A | * | 7/1998 | Tipton | B23K 31/02 114/79 W |
| 9,482,259 | B2 | * | 11/2016 | Buettner | F16B 33/00 |

FOREIGN PATENT DOCUMENTS

| | | |
|---|---|---|
| GB | 2287679 | 9/1995 |
| GB | 2520824 | 6/2015 |

* cited by examiner

MOUNTING BOLT FOR SUB-FRAME

CROSS-REFERENCE TO RELATED APPLICATION

This application claims priority to and the benefit of Korean Patent Application No. 10-2015-0181674 filed in the Korean Intellectual Property Office on Dec. 18, 2015, the entire contents of which are incorporated herein by reference.

BACKGROUND OF THE INVENTION (a) Field of the Invention

The present invention relates to a mounting bolt for a sub-frame. More particularly, the present invention relates to a mounting bolt for a sub-frame that uses a joining plate of a steel material to be welded to a mounting bracket through one welding process.

(b) Description of the Related Art

Generally, a sub-frame is assembled to a lower portion of a front side member in a monocoque vehicle body structure.

The sub-frame supports an engine and a transmission, and induces the engine and the transmission to be dropped such that the engine or the transmission does not push into an interior room through a dash panel to secure safety of a passenger.

Figure 1:
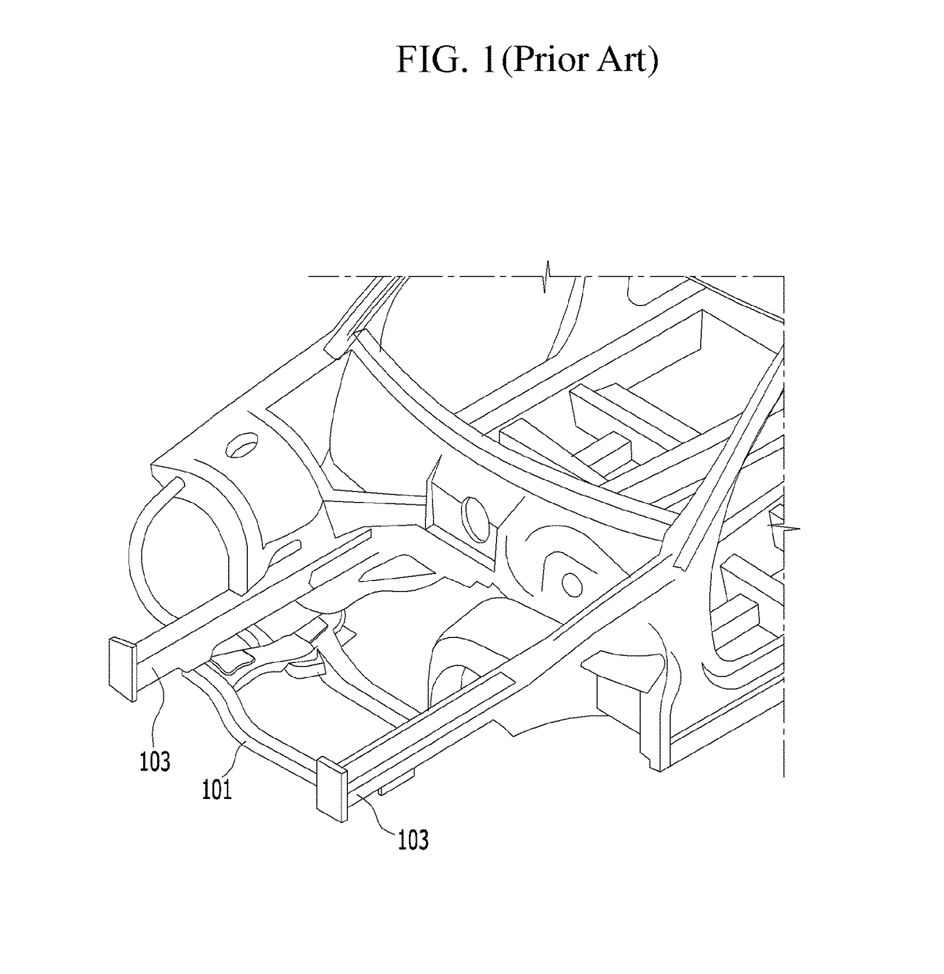
FIG. 1 is a perspective view for describing a general sub-frame assembled to a lower portion of a front side member for a vehicle.
Figure 2:
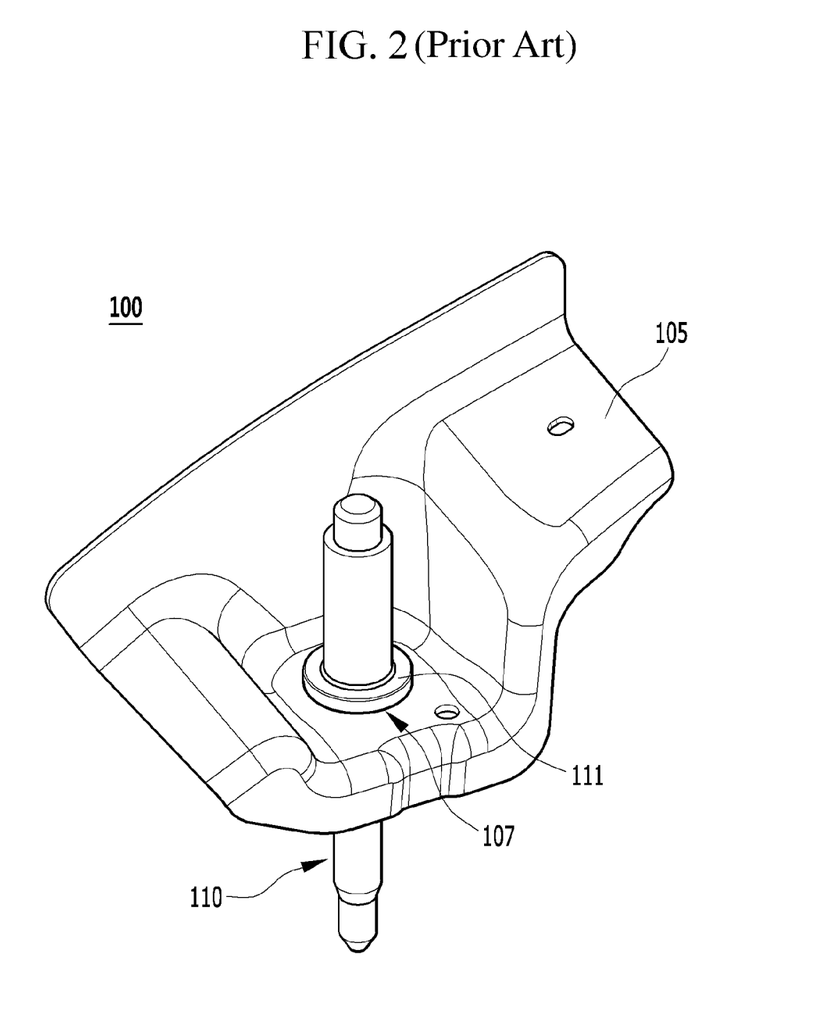
FIG. 2 is a perspective view of a mounting unit for a sub-frame according to a conventional art.

FIG. 1 is a perspective view for describing a general sub-frame assembled to a lower portion of a front side member for a vehicle, and FIG. 2 is a perspective view of a mounting unit for a sub-frame according to a conventional art.

Referring to FIG. 1, both sides of a front and a rear of the sub-frame 101 are assembled by a mounting unit 100 for a frame (hereinafter, a mounting unit) that is configured at a lower portion of both sides of a front side member 103.

Referring to FIG. 2, the mounting unit 100 includes a mounting bolt 110 that is fixed to both sides of a front and a rear of the front side member 103 through a mounting bracket 105, and both sides of a front and a rear of the sub-frame 101 are assembled to the mounting bolt 110.

That is, the mounting bracket 105 is joined to a lower portion of both sides of a front and a rear of the front side member 103.

Also, the mounting bolt 110 is joined by CO2 welding or projection welding in a condition that it is inserted into a through-hole 107 formed on the mounting bracket 105.

Here, the mounting bolt 110 is integrally formed by cold forging or hot forging, and is welded in a condition that it is supported to a circumference of the through-hole 107 of the mounting bracket 105 by a flange portion 111 that is formed along one side circumference.

However, the mounting bolt 110 that is configured as described above has a drawback that the weight is unnecessarily heavy, because it is integrally formed by cold forging or hot forging, and this is a cause that increases cost.

The Description of the Related Art is made to help understanding the background of the present invention, and may include matters out of the related art known to those skilled in the art.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a mounting bolt for a sub-frame having advantages of reducing the number of processes, wherein a joining plate of a steel material is interposed between a bolt body and a support body, and the bolt body, the support body, and the joining plate are welded to a mounting bracket by a single welding process.

A mounting bolt for a sub-frame that is used to engage a sub-frame to a front side member of a vehicle according to one or a plurality of exemplary embodiment of the present invention may include a bolt body that is inserted into a penetration hole of a mounting bracket fixed on the front side member and is joined to the mounting bracket through a first flange that is formed at an upper end circumference thereof, a support body at which a second flange is formed at a lower end circumference to have a hollow space and is disposed on the bolt body, and a joining plate that is interposed between the first flange and the second flange and is welded with a first join protrusion that is formed on an upper surface of the first flange and a second join protrusion that is formed on a lower surface of the second flange by electrical resistance.

The bolt body may be joined to the mounting bracket by electrical resistance welding through a welding protrusion that protrudes along a lower surface circumference of the first flange.

An insert element that protrudes on an upper surface center of the bolt body may be inserted into a lower end portion of the support body to be welded thereto.

The joining plate may have a disk shape in which a penetration hole is formed at a center portion thereof.

The joining plate may have a contact element of which the thickness is thicker than another part and that is formed along a circumference such that a first join protrusion of the first flange and a second join protrusion of the second flange are seated to be supported by the contact element.

The bolt body and the support body may be welded by single resistance welding in a condition that a joining plate is interposed between the first flange and the second flange and the bolt body is inserted into a penetration hole of a mounting bracket.

The resistance welding may be performed by projection welding.

In an exemplary embodiment of the present invention, a joining plate of a steel material is interposed between a bolt body and a support body, and the bolt body, the support body, and the joining plate are welded to a mounting bracket by a single welding process such that the number of processes is reduced and the production cost is saved.

Also, an exemplary embodiment of the present invention uses a support body having a hollow space portion, and thus weight is reduced, strength is maintained, and cost is saved.

Furthermore, effects which may be obtained or predicted by the exemplary embodiment of the present invention will be directly or implicitly disclosed in the detailed description of the exemplary embodiments of the present invention. That is, various effects which are predicted by the exemplary embodiments of the present invention will be disclosed in the detailed description to be described below.

DETAILED DESCRIPTION OF THE EMBODIMENTS

Hereinafter, an exemplary embodiment of the present invention will be described with reference to accompanying drawings. However, the attached drawings and a detailed description to be given later relate to an exemplary embodiment of several exemplary embodiments for effectively describing a characteristic of the present invention. Therefore, the present invention is not limited to only the following drawings and description.

Figure 3:
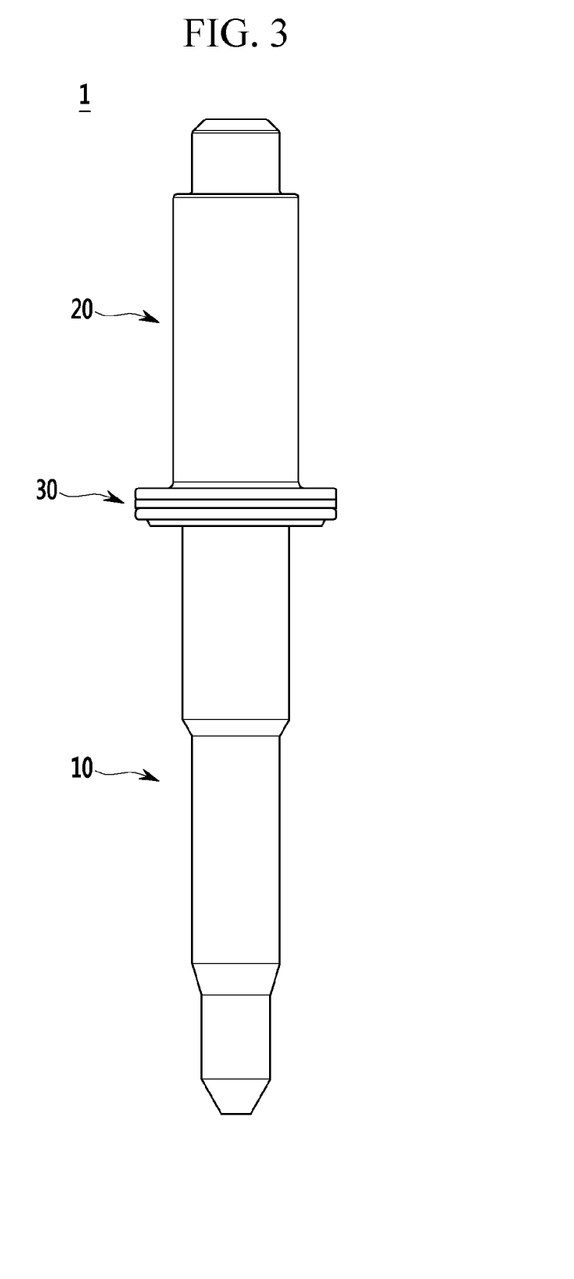
FIG. 3 is a front view of a mounting bolt for a sub-frame according to an exemplary embodiment of the present invention.
Figure 4:
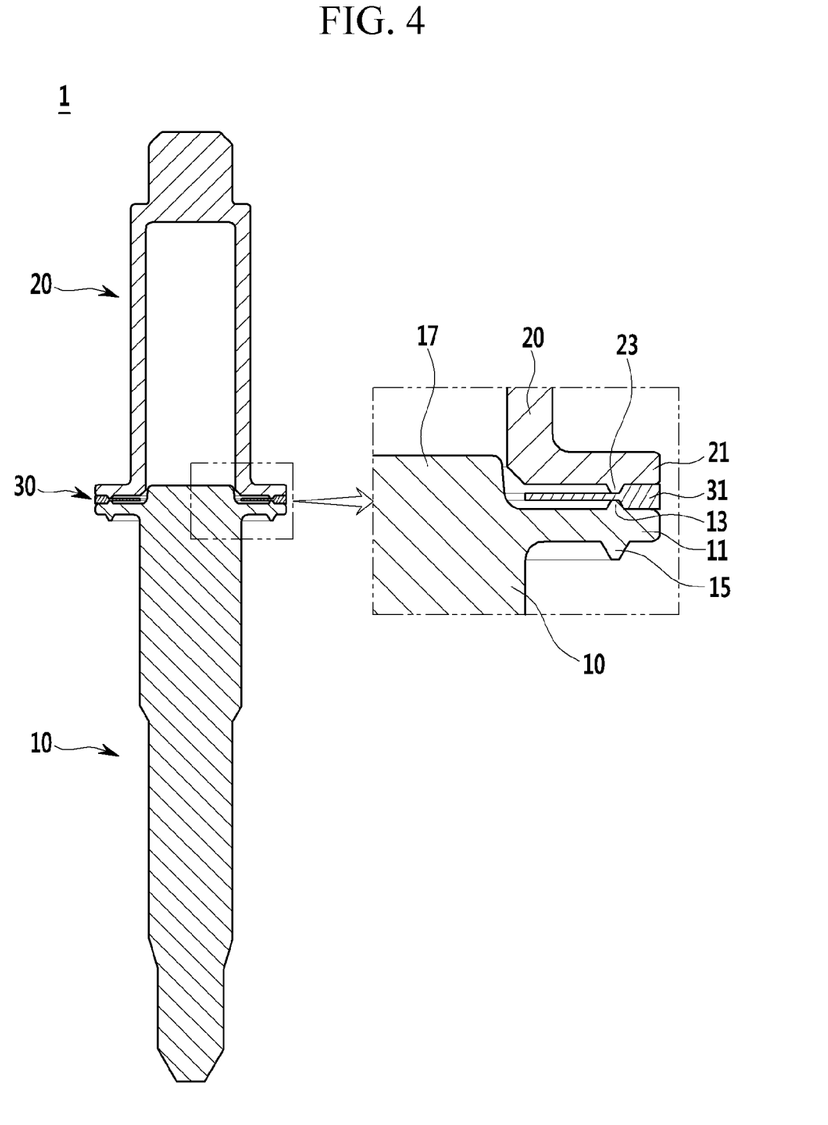
FIG. 4 is a cross-sectional view of a mounting bolt for a sub-frame according to an exemplary embodiment of the present invention.
Figure 5:
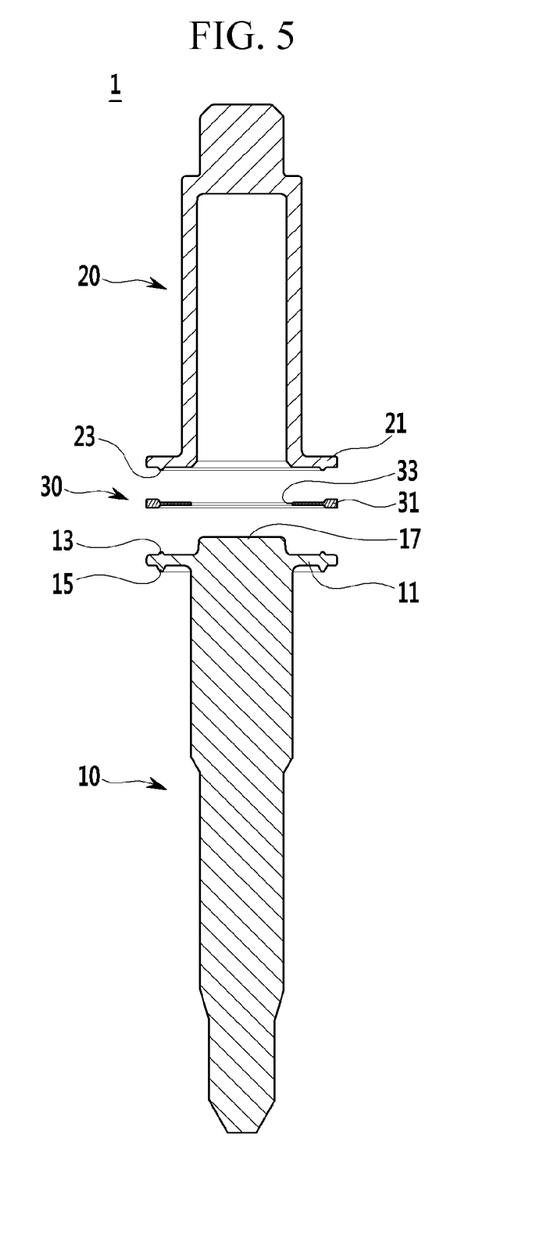
FIG. 5 is an exploded sectional view of a mounting bolt for a sub-frame according to an exemplary embodiment of the present invention.
Figure 6:
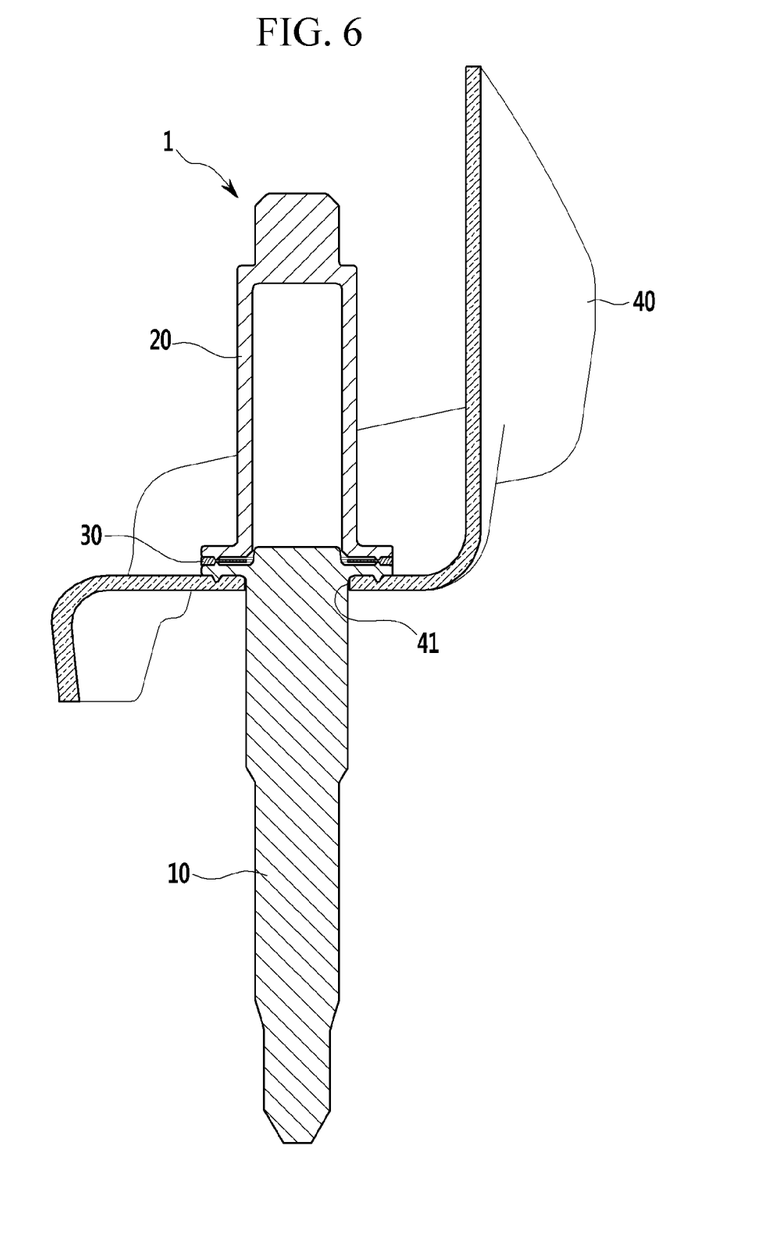
FIG. 6 is a cross-sectional view of a mounting bolt for a sub-frame that is applied to a mounting bracket according to an exemplary embodiment of the present invention.

FIG. 3 is a front view of a mounting bolt for a sub-frame according to an exemplary embodiment of the present invention, FIG. 4 is a cross-sectional view of a mounting bolt for a sub-frame according to an exemplary embodiment of the present invention, FIG. 5 is an exploded sectional view of a mounting bolt for a sub-frame according to an exemplary embodiment of the present invention, and FIG. 6 is a cross-sectional view of a mounting bolt for a sub-frame that is applied to a mounting bracket according to an exemplary embodiment of the present invention.

Referring to FIG. 3 to FIG. 5, a mounting bolt 1 for a sub-frame (hereinafter, "mounting bolt") according to an exemplary embodiment of the present invention is used to combine a sub-frame (not shown) to a front side member (not shown) of a vehicle.

The mounting bolt 1 guides an engine or a transmission that is assembled to a lower portion of a vehicle body to reduce damage to a passenger when a front end of a vehicle collides.

The mounting bolt 1 is fixed to a lower portion of a front side member through a mounting bracket 40 and includes a bolt body 10, a support body 20, and a joining plate 30.

Firstly, the bolt body 10 is inserted into a penetration hole 41 of the mounting bracket 40 that is fixed to a front side member.

In this condition, the bolt body 10 is joined to the mounting bracket 40 through a first flange 11 that is formed at an upper end circumference.

Here, the first flange 11 has a larger diameter than that of the penetration hole 41 of the mounting bracket 40.

Also, the bolt body 10 includes a welding protrusion 15 that protrudes along a lower surface circumference of the first flange 11.

A front end of the welding protrusion 15 has a sharp shape and the welding protrusion 15 consists of a steel material.

The bolt body 10 is resistance-welded to the mounting bracket 40 through the welding protrusion 15.

Also, the bolt body 10 has a first join protrusion 13 that is formed along an upper surface circumference of the first flange 11.

In this configuration, a front end of the first join protrusion 13 has a sharp shape and the first join protrusion 13 consists of a steel material.

Further, the support body 20 has a hollow space therein, and is configured at an upper portion of the bolt body 10.

A lower end of the support body 20 is joined to the first flange 11 of the bolt body 10 along a straight line, and an upper end thereof is fixed to a front side member.

In a condition that an insert element 17 that protrudes on an upper surface center of the bolt body 10 is inserted into a lower end portion of the support body 20, the support body 20 is welded to the bolt body 10.

Also, the support body 20 has a second join protrusion 23 that is formed along a lower surface circumference of a second flange 21.

A front end of the second join protrusion 23 has a sharp shape and the second join protrusion 23 consists of a steel material.

Further, the joining plate 30 is interposed between the first flange 11 of the bolt body 10 and the second flange 21 of the support body 20.

Also, the joining plate 30 has a disk shape with a penetration hole 33 formed at a center portion thereof.

The joining plate 30 has a contact element 31 of which thickness is thicker than another part and that is formed along a circumference of the joining plate 30, and the first join protrusion 13 that is formed at an upper surface of a first flange 11 and the second join protrusion 23 that is formed at a lower surface of a second flange 21 are seated to be supported by the contact element 31.

That is, a penetration hole 33 is formed at a center portion of the joining plate 30, the contact element 31 of which a thickness is thicker than the other part is formed along an outermost circumference, and an inner side of the contact element 31 is supported by the first join protrusion 13 and the second join protrusion 23.

The joining plate 30 consists of a steel material and is resistance-welded with the first join protrusion 13 and the second join protrusion 23.

Referring to FIG. 6, the mounting bolt 1 that is described above is welded by a single resistance welding process in a condition in which the joining plate 30 is interposed between the bolt body 10 and the support body 20 and the bolt body 10 is inserted into the penetration hole 41 of the mounting bracket 40.

That is, the mounting bolt 1 is welded to the mounting bracket 40 through the welding protrusion 15 that is formed at a lower surface of the first flange 11 in a condition that the contact element 31 of the joining plate 30 contacts the first flange 11 of the bolt body 10 and the second flange 21 of the support body 20 to be supported by the first join protrusion 13 and the second join protrusion 23.

In this configuration, the first join protrusion 13, the second join protrusion 23, the welding protrusion 15, and the joining plate 30 include a steel material and are melted by a welding process to improve welding strength.

Here, the resistance welding can be projection welding, but it is not limited thereto, and any method that can realize welding quality equal or similar to projection welding can be applied.

Accordingly, in the mounting bolt 1 according to an exemplary embodiment of the present invention, the joining plate 30 of a steel material is interposed between the bolt body 10 and the support body 20, and the bolt body 10, the support body 20, and the joining plate 30 are welded by a single welding process to the mounting bracket 40 such that the number of processes is reduced and the production cost is saved.

Also, the mounting bolt 1 according to an exemplary embodiment of the present invention is applied with a support body 20 having a hollow space portion such that weight is reduced, stiffness is maintained, and cost is saved.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

1 . . . mounting bolt
10 . . . bolt body
11 . . . first flange
13 . . . first join protrusion
15 . . . welding protrusion
17 . . . insert element
20 . . . support body
21 . . . second flange
23 . . . second join protrusion
30 . . . joining plate
31 . . . contact element
33 . . . penetration hole of a joining plate
40 . . . mounting bracket
41 . . . penetration hole of a mounting bracket

What is claimed is:

1. A mounting bolt for a sub-frame that is used to engage a sub-frame to a front side member of a vehicle, comprising:
    a bolt body that is inserted into a penetration hole of a mounting bracket fixed on the front side member and is joined to the mounting bracket through a first flange that is formed at an upper end circumference thereof;
    a support body at which a second flange is formed at a lower end circumference to have a hollow space and is disposed on the bolt body; and
    a joining plate that is interposed between the first flange and the second flange and is welded with a first join protrusion that is formed on an upper surface of the first flange and a second join protrusion that is formed on a lower surface of the second flange by electrical resistance.

2. The mounting bolt for a sub-frame of claim 1, wherein the bolt body is joined to the mounting bracket by electrical resistance welding through a welding protrusion that protrudes along a lower surface circumference of the first flange.

3. The mounting bolt for a sub-frame of claim 1, wherein an insert element that protrudes on an upper surface center of the bolt body is inserted into a lower end portion of the support body.

4. The mounting bolt for a sub-frame of claim 1, wherein the joining plate has a disk shape in which a penetration hole is formed at a center portion thereof.

5. The mounting bolt for a sub-frame of claim 1, wherein the joining plate has a contact element of which the thickness is thicker than another part and that is formed along a circumference such that the first join protrusion of the first flange and the second join protrusion of the second flange are seated to be supported by the contact element.

6. The mounting bolt for a sub-frame of claim 1, wherein the bolt body and the support body are welded by single resistance welding in a condition that the joining plate is interposed between the first flange and the second flange and the bolt body is inserted into the penetration hole of a mounting bracket.

7. The mounting bolt for a sub-frame of claim 6, wherein the resistance welding is performed by projection welding.

* * * * *